United States Patent
Cui et al.

(10) Patent No.: US 10,333,427 B2
(45) Date of Patent: Jun. 25, 2019

(54) EQUIVALENT TRANSISTOR AND THREE-LEVEL INVERTER

(71) Applicant: HUAWEI TECHNOLOGIES CO., LTD., Shenzhen (CN)

(72) Inventors: Zhaoxue Cui, Shenzhen (CN); Chuntao Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/015,217

(22) Filed: Jun. 22, 2018

(65) Prior Publication Data

US 2018/0302005 A1 Oct. 18, 2018

Related U.S. Application Data

(63) Continuation of application No. PCT/CN2016/111373, filed on Dec. 21, 2016.

(30) Foreign Application Priority Data

Dec. 23, 2015 (CN) .......................... 2015 1 0981520

(51) Int. Cl.
*H02M 7/487* (2007.01)
*H02M 7/537* (2006.01)
*H02M 1/00* (2006.01)

(52) U.S. Cl.
CPC .......... *H02M 7/537* (2013.01); *H02M 7/487* (2013.01); *H02M 2001/0051* (2013.01); *Y02B 70/1491* (2013.01)

(58) Field of Classification Search
CPC .. H01L 29/739; H01L 27/0605; H02M 7/487; H02M 7/48; H03K 17/6871; H02H 7/122

(Continued)

(56) References Cited

U.S. PATENT DOCUMENTS 6,697,274 B2 * 2/2004 Bernet ................. H02M 7/487
363/132
6,838,925 B1 * 1/2005 Nielsen ................ H02M 7/487
327/391

(Continued)

FOREIGN PATENT DOCUMENTS

CN 102611342 A 7/2012
CN 102946205 A 2/2013

(Continued)

OTHER PUBLICATIONS

Domingo Ruiz-Caballero et al, Symmetrical hybrid multilevel inverter concept based on multi-state switching cells. XI Brazilian Power Electronics Conference, Nov. 21, 2011, 6 pages.

*Primary Examiner* — Rajnikant B Patel
(74) *Attorney, Agent, or Firm* — Kilpatrick Townsend & Stockton LLP

(57) ABSTRACT

This disclosure relates to an equivalent transistor and a three-level inverter, and pertains to the field of power electronics technologies. The equivalent transistor includes a first transistor, a second transistor, and a diode. A source electrode of the first transistor is electrically connected to a source electrode of the second transistor; a gate electrode of the first transistor is electrically connected to a gate electrode of the second transistor; and one end of the diode is electrically connected to a drain electrode of the first transistor, and the other end of the diode is electrically connected to a drain electrode of the second transistor. According to this disclosure, a reverse recovery time can be reduced, and a switching speed of the equivalent transistor can increase.

15 Claims, 14 Drawing Sheets

(58) Field of Classification Search
USPC ...... 363/41, 98, 131, 123, 132, 140; 257/76, 257/77, 192, E29.089; 327/109
See application file for complete search history.

(56) References Cited

U.S. PATENT DOCUMENTS

| | | | |
|---|---|---|---|
| 7,995,362 B2* | 8/2011 | Paull | H02M 7/5387 |
| | | | 363/131 |
| 8,582,331 B2* | 11/2013 | Frisch | H02M 7/48 |
| | | | 363/131 |
| 8,929,114 B2* | 1/2015 | Li | H02M 1/34 |
| | | | 363/130 |
| 9,397,584 B2* | 7/2016 | Oughton, Jr. | H02M 7/797 |
| 9,716,444 B2* | 7/2017 | Wagoner | H02M 7/5395 |
| 2010/0097105 A1* | 4/2010 | Morita | H01L 27/0605 |
| | | | 327/109 |
| 2011/0013438 A1 | 1/2011 | Frisch et al. | |
| 2016/0285386 A1 | 9/2016 | Kataoka et al. | |

FOREIGN PATENT DOCUMENTS

| | | |
|---|---|---|
| CN | 103312202 A | 9/2013 |
| CN | 104638959 A | 5/2015 |
| CN | 105553318 A | 5/2016 |
| EP | 2413489 A1 | 2/2012 |
| EP | 2590312 A1 | 5/2013 |
| EP | 2662968 A1 | 11/2013 |
| EP | 2869452 A1 | 5/2015 |
| EP | 2871765 A1 | 5/2015 |
| JP | 05211776 A | 8/1993 |
| JP | 2014147213 A | 8/2014 |
| WO | 2013135181 A1 | 9/2013 |
| WO | 2015079762 A1 | 6/2015 |

* cited by examiner

Note: ① and ② in the figure respectively represent a first end and a second end of a corresponding component

EQUIVALENT TRANSISTOR AND THREE-LEVEL INVERTER

CROSS-REFERENCE TO RELATED APPLICATIONS

This application is a continuation of International Application No. PCT/CN2016/111373, filed on Dec. 21, 2016, which claims priority to Chinese Patent Application No. 201510981520.X, filed on Dec. 23, 2015, The disclosures of the aforementioned applications are hereby incorporated by reference in their entireties.

TECHNICAL FIELD

This disclosure relates to the field of power electronics technologies, and in particular, to an equivalent transistor and a three-level inverter.

BACKGROUND

With rapid development of electronic technologies, transistors are more widely used.

Some transistors have a parasitic diode. When an extremely high voltage is loaded at two ends of the transistor, the diode is usually first overshot by a reverse voltage, and then an extremely high current flows through a branch circuit in which the diode is located, and does not flow through a branch circuit in which the transistor is located, so that the transistor can be prevented from being overshot by a high voltage.

In a process of implementing this disclosure, the inventor finds that at least the following problems exist:

A parasitic diode of a transistor generally has a relatively poor reverse recovery feature. Reverse recovery means that a conducted diode accumulates a specific amount of electric charges, and when the diode is cut off, the diode releases the accumulated electric charges to form a current in a specific time until the electric charges are released. The relatively poor reverse recovery feature means that an electric charge release time is relatively long. In a transistor switching circuit, when a transistor enters a cut-off state from a conducted state, a parasitic diode needs a relatively long time to release a stored electric charge, a forward current on the parasitic diode cannot quickly disappear, and a relatively long time is required before a state in which a current is cut off can be entered. Therefore, a switching speed of the transistor is relatively low.

SUMMARY

To overcome a problem in the related technology, this disclosure provides an equivalent transistor and a three-level inverter. The technical solutions are as follows:

According to a first aspect, an equivalent transistor is provided, where the equivalent transistor includes a first transistor, a second transistor, and a diode;

a source electrode of the first transistor is electrically connected to a source electrode of the second transistor;

a gate electrode of the first transistor is electrically connected to a gate electrode of the second transistor; and one end of the diode is electrically connected to a drain electrode of the first transistor, and the other end of the diode is electrically connected to a drain electrode of the second transistor.

With reference to the first aspect, in a first possible implementation of the first aspect, the first transistor and the second transistor are MOSFETs.

In this way, because the MOSFET has relatively good high frequency performance, the equivalent transistor has relatively good high frequency performance.

With reference to the first aspect, in a second possible implementation of the first aspect, the diode is a fast recovery diode.

In this way, a reverse recovery time of the equivalent transistor may be effectively reduced.

With reference to the first aspect, in a third possible implementation of the first aspect, a connection end of the gate electrode of the first transistor and the gate electrode of the second transistor is an equivalent gate electrode of the equivalent transistor; and a connection end of the source electrode of the first transistor and the source electrode of the second transistor is used to connect a low electric potential end.

In this way, the equivalent transistor may be controlled by changing voltages loaded on the source electrode and the gate electrode.

According to a second aspect, a three-level inverter is provided, where the three-level inverter is an I-type three-level inverter, and an outer switching transistor of the three-level inverter is the equivalent transistor according to the first aspect.

With reference to the second aspect, in a first possible implementation of the second aspect, an inner switching transistor of the three-level inverter is a MOSFET.

In this way, because the MOSFET has relatively good high frequency performance, the three-level inverter has relatively good high frequency performance.

With reference to the second aspect, in a second possible implementation of the second aspect, the three-level inverter includes a first outer switching transistor, a second outer switching transistor, a first inner switching transistor, and a second inner switching transistor, and the first outer switching transistor, the first inner switching transistor, the second inner switching transistor, and the second outer switching transistor are sequentially connected in series to a circuit; and the first outer switching transistor and the second inner switching transistor are complementarily conducted, and the first inner switching transistor and the second outer switching transistor are complementarily conducted.

According to a third aspect, a three-level inverter is provided, where the three-level inverter includes two direct current power supplies, four power frequency rectifier transistors, and two equivalent transistors according to any one of the first aspect to the third possible implementation of the first aspect, the two direct current power supplies are a first direct current power supply and a second direct current power supply respectively, the four power frequency rectifier transistors are a first power frequency rectifier transistor, a second power frequency rectifier transistor, a third power frequency rectifier transistor, and a fourth power frequency rectifier transistor respectively, and the two equivalent transistors are a first equivalent transistor and a second equivalent transistor respectively;

a first end of the first power frequency rectifier transistor is electrically connected to a first end of the first direct current power supply, a second end of the first power frequency rectifier transistor is electrically connected to a first end of the second power frequency rectifier transistor, a second end of the second power frequency rectifier transistor is electrically connected to a second end of the first direct current power supply, a first end of the third power frequency rectifier transistor is electrically connected to a first end of the second direct current power supply, a second end of the third power frequency rectifier transistor is electrically connected to a first end of the fourth power frequency rectifier transistor, and a second end of the fourth power frequency rectifier transistor is electrically connected to a second end of the second direct current power supply;

the second end of the second power frequency rectifier transistor, the second end of the first direct current power supply, the first end of the third power frequency rectifier transistor, and the first end of the second direct current power supply are electrically connected and grounded;

a second end of the first equivalent transistor is electrically connected to a first end of the second equivalent transistor, a first end of the first equivalent transistor, the second end of the first power frequency rectifier transistor, and the first end of the second power frequency rectifier transistor are electrically connected, and a second end of the second equivalent transistor, the second end of the third power frequency rectifier transistor, and the first end of the fourth power frequency rectifier transistor are electrically connected; and a connection end of the first equivalent transistor and the second equivalent transistor is an output end of the three-level inverter.

With reference to the third aspect, in a first possible implementation of the third aspect, all of the four power frequency rectifier transistors are IGBTs.

In this way, because the IGBT can withstand a relatively high voltage, the three-level inverter can also withstand a relatively high voltage.

With reference to the third aspect, in a second possible implementation of the third aspect, based on control signals of the first power frequency rectifier transistor, the second power frequency rectifier transistor, the third power frequency rectifier transistor, and the fourth power frequency rectifier transistor, in an output positive half cycle of the three-level inverter, the first power frequency rectifier transistor and the third power frequency rectifier transistor are conducted, and the second power frequency rectifier transistor and the fourth power frequency rectifier transistor are cut off; and in an output negative half cycle of the three-level inverter, the first power frequency rectifier transistor and the third power frequency rectifier transistor are cut off, and the second power frequency rectifier transistor and the fourth power frequency rectifier transistor are conducted; and based on control signals of the first equivalent transistor and the second equivalent transistor, the first equivalent transistor and the second equivalent transistor are complementarily conducted, and a switching cycle of complementary conduction is less than an output cycle of the three-level inverter.

With reference to the third aspect, in a third possible implementation of the third aspect, the three-level inverter further includes at least one equivalent transistor group, each equivalent transistor group includes two equivalent transistors that are connected in series, a branch circuit formed by connecting the two equivalent transistors in series is connected in parallel to branch circuits of the first equivalent transistor and the second equivalent transistor, and a connection end of the two equivalent transistors in each equivalent transistor group is an output end of the three-level inverter.

In this way, multiple equivalent transistor groups are coupled in a staggered manner and are connected in parallel, so that a switching frequency of the three-level inverter can be improved.

The technical solutions provided in the embodiments of this disclosure may include the following beneficial effects:

In the embodiments of this disclosure, an equivalent transistor includes a first transistor, a second transistor, and a diode. A source electrode of the first transistor is electrically connected to a source electrode of the second transistor; a gate electrode of the first transistor is electrically connected to a gate electrode of the second transistor; and one end of the diode is electrically connected to a drain electrode of the first transistor, and the other end of the diode is electrically connected to a drain electrode of the second transistor. In this way, the diode is a separate diode, and a diode with a relatively good reverse recovery feature may be used. Based on the structure of the equivalent transistor, a current cannot flow through parasitic diodes of the first transistor and the second transistor, but flows through the diode with the relatively good reverse recovery feature. Therefore, a reverse recovery time can be reduced, and a switching speed of the equivalent transistor can increase.

It should be understood that the foregoing general description and the following detailed description are merely examples and explanations, and cannot limit this disclosure.

BRIEF DESCRIPTION OF DRAWINGS

The accompanying drawings herein are incorporated in the specification, become a part of the specification, show embodiments that are in accordance with this disclosure, and are used with the specification to explain a principle of this disclosure. In the accompanying drawings.

The foregoing accompanying drawings show specific embodiments of this disclosure, and more detailed descriptions are provided in the following. The accompanying drawings and text descriptions are not intended to limit the scope of the idea of this disclosure in any manner, but are intended to describe the concept of this disclosure to a person skilled in the art with reference to particular embodiments.

DESCRIPTION OF ILLUSTRATIONS

T101 and T102: transistors
D101: diode
C201 and C202: direct current power supplies
D201 and D202: clamp diodes
Q201', Q204', Q202, and Q203: transistors
Q201 and Q204: equivalent transistors
C301 and C302: direct current power supplies
Q305 and Q306: equivalent transistors
Q301, Q302, Q303, and Q304: power frequency rectifier transistors
G: equivalent transistor group

DESCRIPTION OF EMBODIMENTS

Example embodiments are described in detail herein, and examples of the example embodiments are presented in the accompanying drawings. When the following description relates to the accompanying drawings, unless specified otherwise, same numbers in different accompanying drawings represent a same or similar element. Implementations described in the following example embodiments do not represent all implementations consistent with this disclosure. On the contrary, the implementations are only examples of apparatuses and methods that are described in the appended claims in details and that are consistent with some aspects of this disclosure.

Figure 1:
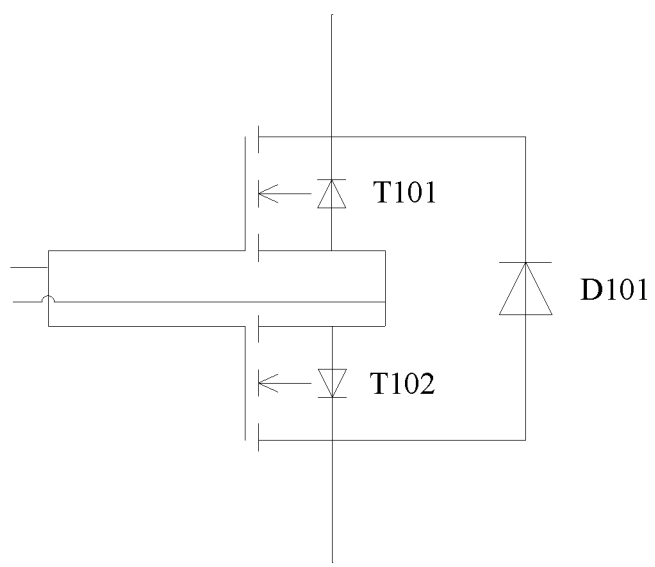
FIG. 1 is a schematic structural diagram of an equivalent transistor according to an example embodiment.

An embodiment of this disclosure provides an equivalent transistor. As shown in FIG. 1, the equivalent transistor includes a first transistor T101, a second transistor T102, and a diode D101.

A source electrode of the first transistor T101 is electrically connected to a source electrode of the second transistor T102. A gate electrode of the first transistor T101 is electrically connected to a gate electrode of the second transistor T102. One end of the diode D101 is electrically connected to a drain electrode of the first transistor T101, and the other end of the diode D101 is electrically connected to a drain electrode of the second transistor T102.

During implementation, the equivalent transistor includes three solid semiconductor devices: the first transistor T101, the second transistor T102, and the diode D101. The equivalent transistor may be equivalent to a transistor. The gate electrode of the first transistor T101 is connected to the gate electrode of the second transistor T102. The source electrode of the first transistor T101 is connected to the source electrode of the second transistor T102. The diode D101 is connected in parallel to the two transistors that are connected; that is, one end of the diode D101 is connected to the drain electrode of the first transistor T101, and the other end is connected to the drain electrode of the second transistor T102. Four pins are extended from the equivalent transistor. The four pins are respectively connected to two drain electrode ends of the two transistors, a common source electrode end, and a common gate electrode end. The equivalent transistor may be considered as a separate switching device.

Optionally, the first transistor T101 and the second transistor T102 are MOSFETs (Metal Oxide Semiconductor Field Effect Transistor, metal oxide semiconductor field effect transistor).

Optionally, the diode D101 is a fast recovery diode.

The fast recovery diode is a semiconductor diode that has a good switching feature and a short reverse recovery time. Generally, a diode whose reverse recovery time is less than 100 ns may be considered as a fast recovery diode.

Optionally, a connection end of the gate electrode of the first transistor T101 and the gate electrode of the second transistor T102 is an equivalent gate electrode of the equivalent transistor, and a connection end of the source electrode of the first transistor T101 and the source electrode of the second transistor T102 is used to connect a low electric potential end.

During implementation, the connection end of the gate electrode of the first transistor T101 and the gate electrode of the second transistor T102 is the equivalent gate electrode of the equivalent transistor, and the connection end of the source electrode of the first transistor T101 and the source electrode of the second transistor T102 is an equivalent source electrode of the equivalent transistor, and is used to connect the low electric potential end. When a difference between voltages on the equivalent source electrode and the equivalent gate electrode of the equivalent transistor is greater than or equal to a specific threshold, the drain electrode and the source electrode of the first transistor T101 are conducted, and the drain electrode and the source electrode of the second transistor T102 are conducted, that is, the equivalent transistor is conducted; or when the difference between the voltages on the source electrode and the gate electrode of the transistor is less than the specific threshold, the drain electrode and the source electrode of the first transistor T101 are cut off, and the drain electrode and the source electrode of the second transistor T102 are cut off, that is, the equivalent transistor is cut off.

Figure 2:
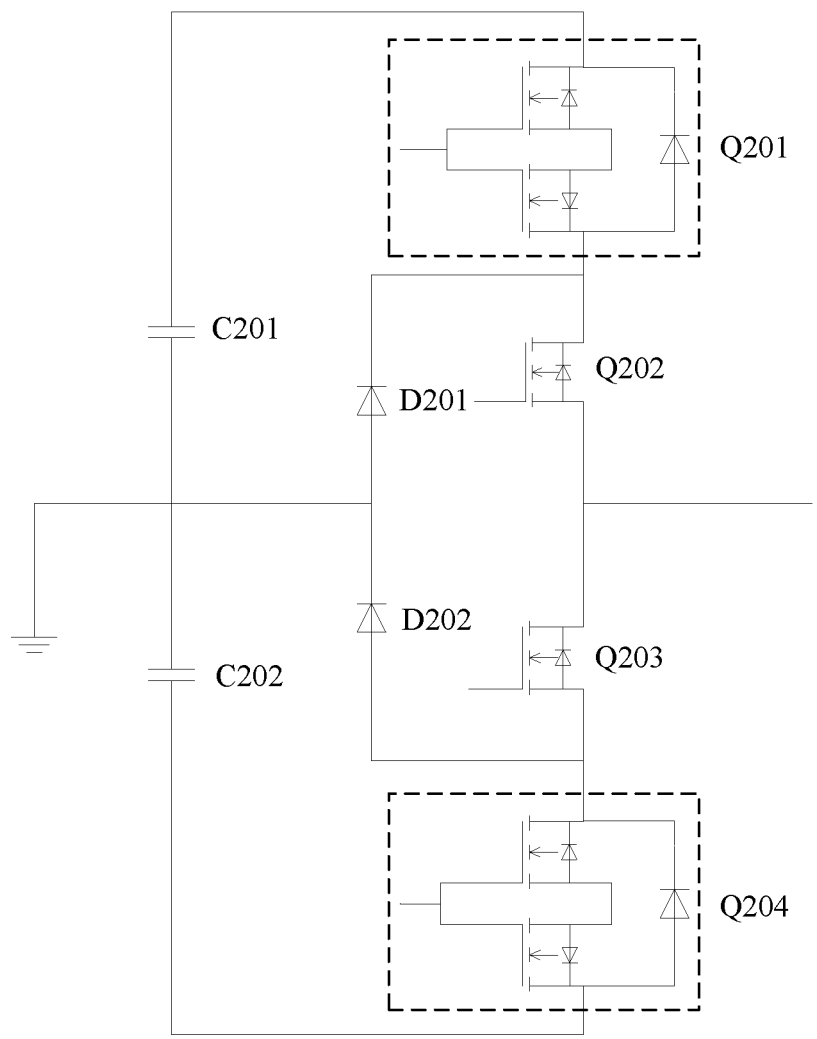
FIG. 2 is a schematic circuit diagram of an I-type three-level inverter according to an example embodiment.

An embodiment further provides a three-level inverter. As shown in FIG. 2, the three-level inverter is an I-type three-level inverter. Outer switching transistor s Q201 and Q204 of the three-level inverter are the foregoing equivalent transistors.

The I-type three-level inverter is a three-level inverter in which four switching components are arranged and connected in an I shape in a circuit structure.

Figure 3:
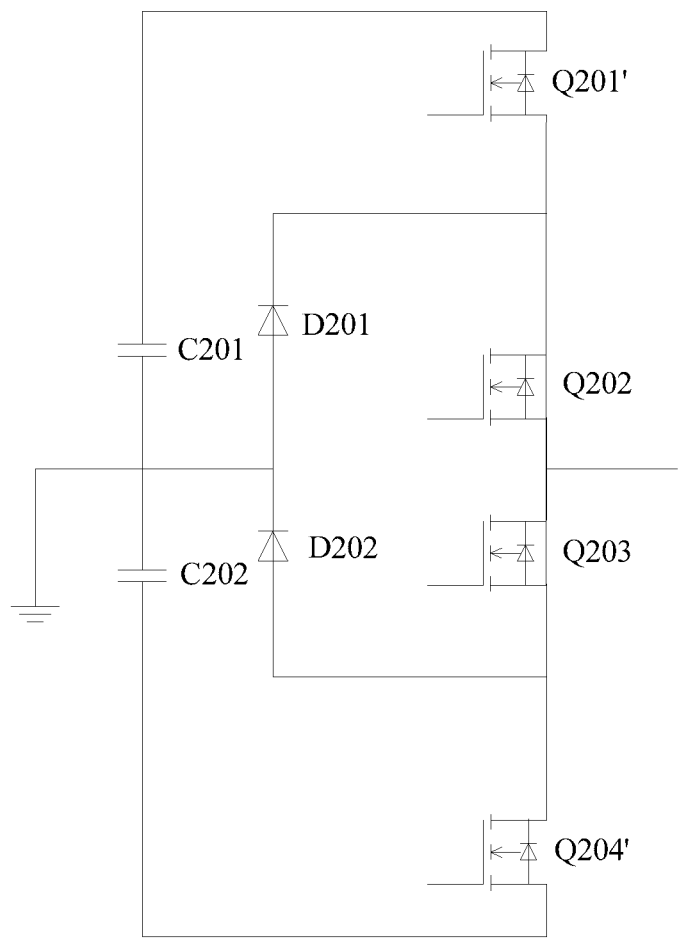
FIG. 3 is a schematic circuit diagram of an I-type three-level inverter according to an example embodiment.
Figure 4:
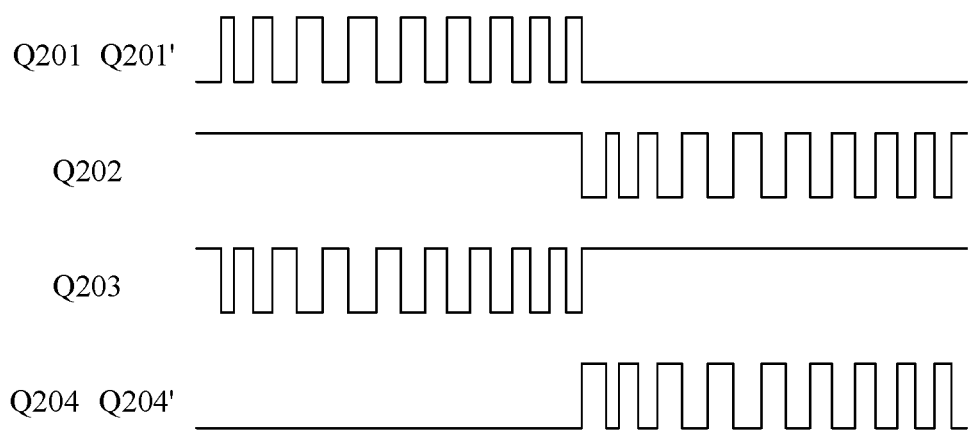
FIG. 4 is a schematic diagram of a control signal according to an example embodiment.
Figure 5:
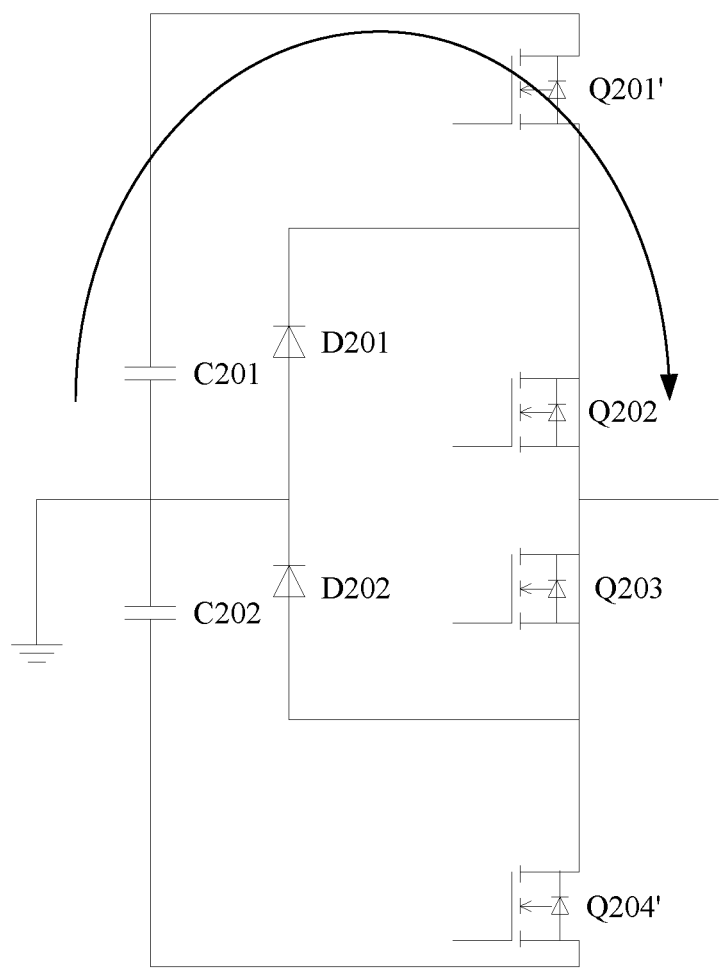
FIG. 5 is a schematic diagram of a flow direction of a current in a working state according to an example embodiment.
Figure 6:
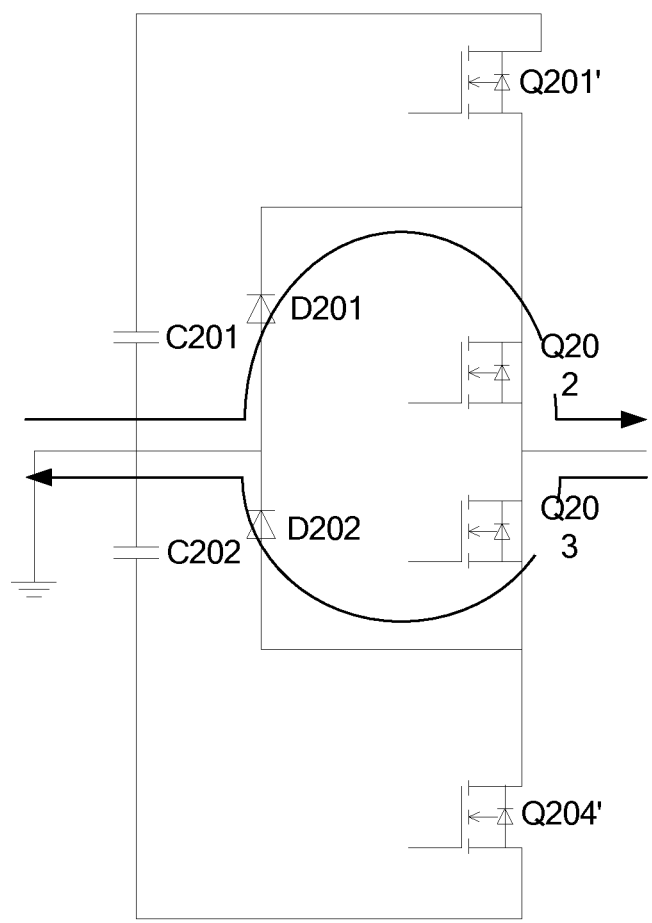
FIG. 6 is a schematic diagram of a flow direction of a current in a working state according to an example embodiment.
Figure 7:
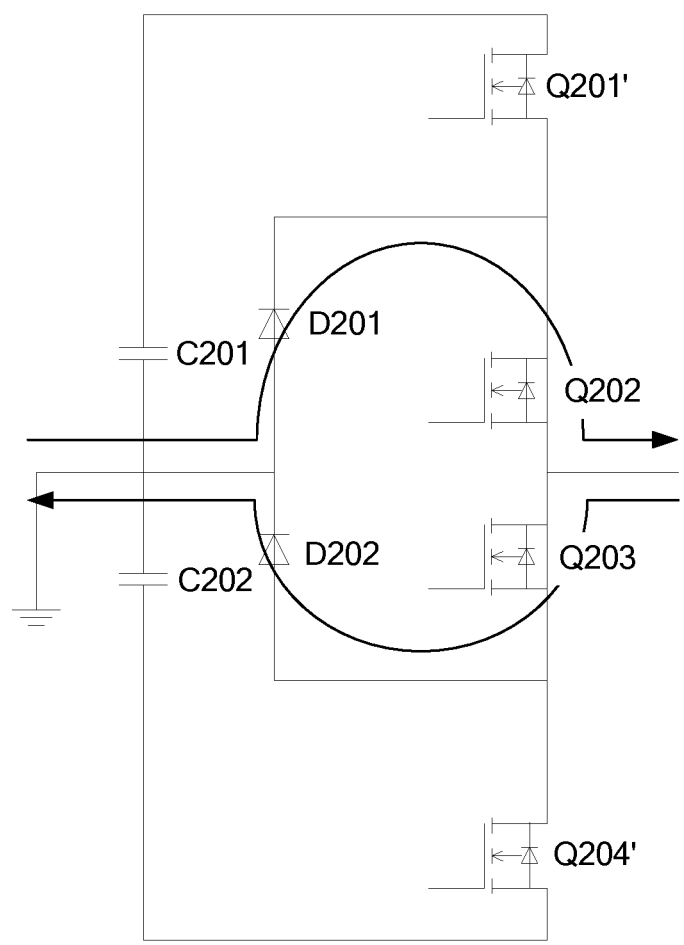
FIG. 7 is a schematic diagram of a flow direction of a current in a working state according to an example embodiment.
Figure 8:
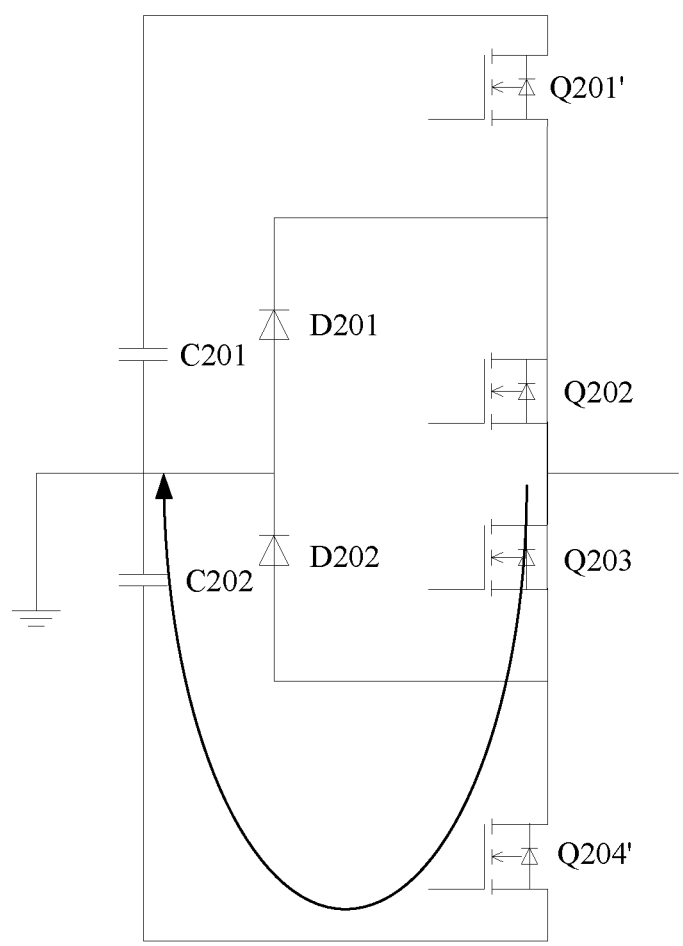
FIG. 8 is a schematic diagram of a flow direction of a current in a working state according to an example embodiment.

During implementation, the three-level inverter is a device that can convert a direct current into an alternating current, and provide three electric potentials at an output end. A conventional circuit structure of the I-type three-level inverter is shown in FIG. 3. Capacitors C201 and C202 are direct current sources, and provide direct current voltages of −U/2 to +U/2. Transistors Q201', Q202, Q203, and Q204' are high frequency switching components such as MOSFETs, and are connected in series between positive electrodes and negative electrodes of the direct current sources. Clamp diodes D201 and D202 are anti-parallel connected between an upper bridge arm and a lower bridge arm. During working, the outer switching transistor Q201' and the inner switching transistor Q203 are complementarily conducted, and the inner switching transistor Q202 and the outer switching transistor Q204' are complementarily conducted. Control signals are shown in FIG. 4. In a positive half cycle in which the three-level inverter outputs an alternating current, Q201' and Q203 are complementarily conducted, there is a dead time, Q202 is continuously conducted, and Q204' is continuously cut off. In a negative half cycle, Q202 and Q204' are complementarily conducted, there is a dead time, Q203 is continuously conducted, and Q201' is continuously cut off. FIG. 5 is a schematic diagram of a current when Q201' and Q202 are conducted in the positive half cycle, and a direction of the current is from C201 to Q201' and then to Q202. FIG. 6 is a schematic diagram of a current when Q203 and Q202 are conducted in the positive half cycle, and a direction of the current is from a ground terminal to D201 and then to Q202, or is from Q203 to D202 and then to a ground terminal. FIG. 7 is a schematic diagram of a current when Q202 and Q203 are conducted in the negative half cycle, and a direction of the current is from a ground terminal to D201 and then to Q202, or is from Q203 to D202 and then to a ground terminal. FIG. 8 is a schematic diagram of a current when Q203 and Q204' are conducted in the negative half cycle, and a direction of the current is from Q203 to Q204' and then to C202.

In this solution, the outer switching transistor s Q201' and Q204' are replaced with the foregoing equivalent transistors Q201 and Q204, and other parts are the same as those in the prior art. In this way, a problem that parasitic diodes of the original outer switching transistor s Q201' and Q204' have poor reverse recovery performance is effectively avoided without changing control signals of the four switching devices.

Optionally, the inner switching transistors Q202 and Q203 of the three-level inverter are MOSFETs.

Figure 9:
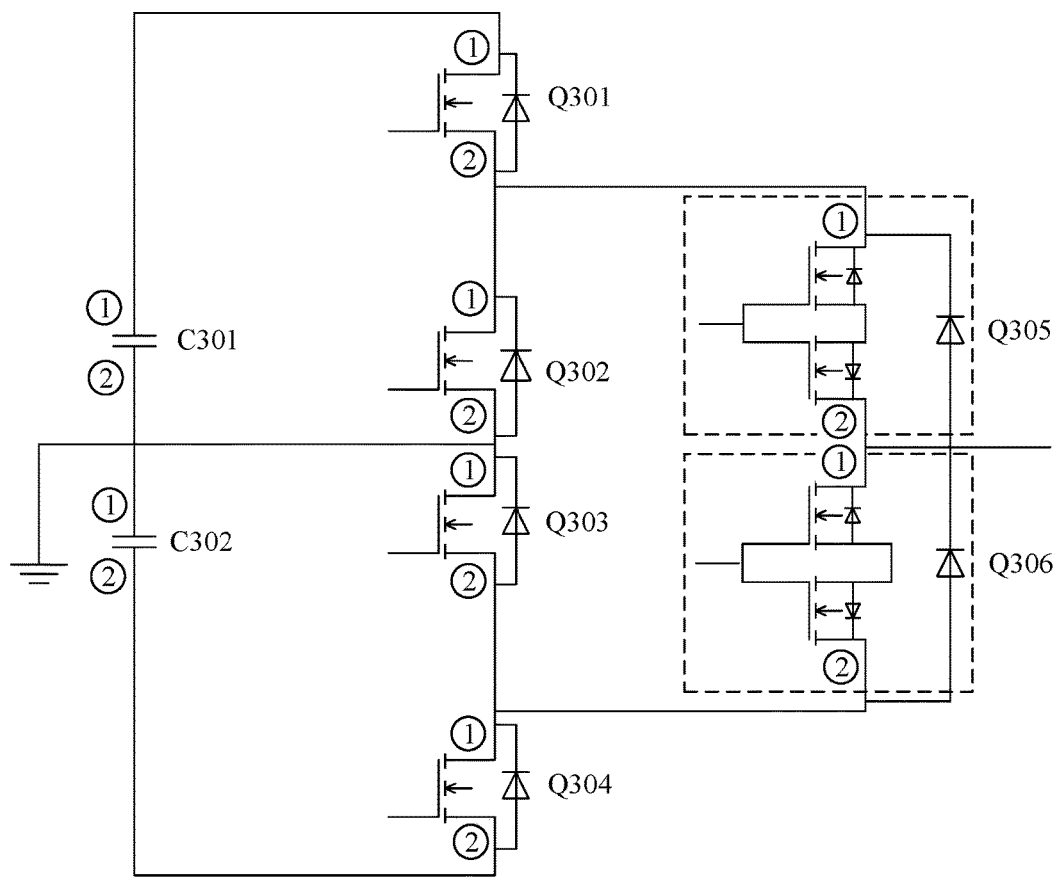
FIG. 9 is a schematic circuit diagram of a three-level inverter according to an example embodiment.

An embodiment further provides a three-level inverter. As shown in FIG. 9, the three-level inverter includes two direct current power supplies, four power frequency rectifier transistors, and two equivalent transistors. The two direct current power supplies are a first direct current power supply C301 and a second direct current power supply C302 respectively. The four power frequency rectifier transistors are a first power frequency rectifier transistor Q301, a second power frequency rectifier transistor Q302, a third power frequency rectifier transistor Q303, and a fourth power frequency rectifier transistor Q304 respectively. The two equivalent transistors are a first equivalent transistor Q305 and a second equivalent transistor Q306 respectively.

A first end of the first power frequency rectifier transistor Q301 is electrically connected to a first end of the first direct current power supply C301. A second end of the first power frequency rectifier transistor Q301 is electrically connected to a first end of the second power frequency rectifier transistor Q302. A second end of the second power frequency rectifier transistor Q302 is electrically connected to a second end of the first direct current power supply C301. A first end of the third power frequency rectifier transistor Q303 is electrically connected to a first end of the second direct current power supply C302. A second end of the third power frequency rectifier transistor Q303 is electrically connected to a first end of the fourth power frequency rectifier transistor Q304. A second end of the fourth power frequency rectifier transistor Q304 is electrically connected to a second end of the second direct current power supply C302. The second end of the second power frequency rectifier transistor Q302, the second end of the first direct current power supply C301, the first end of the third power frequency rectifier transistor Q303, and the first end of the second direct current power supply C302 are electrically connected and grounded. A second end of the first equivalent transistor Q305 is electrically connected to a first end of the second equivalent transistor Q306. A first end of the first equivalent transistor Q305, the second end of the first power frequency rectifier transistor Q301, and the first end of the second power frequency rectifier transistor Q302 are electrically connected. A second end of the second equivalent transistor Q306, the second end of the third power frequency rectifier transistor Q303, and the first end of the fourth power frequency rectifier transistor Q304 are electrically connected. A connection end of the first equivalent transistor Q305 and the second equivalent transistor Q306 is an output end of the three-level inverter.

The power frequency rectifier transistor is a transistor that can convert an alternating current whose direction alternately changes into a direct current that has a single direction.

During implementation, capacitors C301 and C302 are direct current supplies, and provide direct current voltages of $-U/2$ to $+U/2$. Transistors Q301, Q302, Q303, and Q304 are power frequency rectifier transistors, and are connected in series between positive electrodes and negative electrodes of direct current power supplies. There is an electric potential of 0 between Q302 and Q303. The equivalent transistors Q305 and Q306 are connected in series, and a branch circuit is connected in parallel to Q302 and Q303. A connection end of Q305 and Q306 is an output end of the three-level inverter.

Optionally, all of the four power frequency rectifier transistors are IGBTs (Insulated Gate Bipolar Transistor, insulated gate bipolar transistor).

Optionally, based on control signals of the first power frequency rectifier transistor Q301, the second power frequency rectifier transistor Q302, the third power frequency rectifier transistor Q303, and the fourth power frequency rectifier transistor Q304, in an output positive half cycle of the three-level inverter, the first power frequency rectifier transistor Q301 and the third power frequency rectifier transistor Q303 are conducted, and the second power frequency rectifier transistor Q302 and the fourth power frequency rectifier transistor Q304 are cut off; and in an output negative half cycle of the three-level inverter, the first power frequency rectifier transistor Q301 and the third power frequency rectifier transistor Q303 are cut off, and the second power frequency rectifier transistor Q302 and the fourth power frequency rectifier transistor Q304 are conducted. Based on control signals of the first equivalent transistor Q305 and the second equivalent transistor Q306, the first equivalent transistor Q305 and the second equivalent transistor Q306 are complementarily conducted, and a switching cycle of complementary conduction is less than an output cycle of the three-level inverter.

The output positive half cycle and the output negative half cycle are respectively a positive half cycle and a negative half cycle of an alternating current output by the three-level inverter. The switching cycle is a period in which Q305 or Q306 is conducted, cut off, and then conducted again, and a length of the switching cycle continuously changes sinusoidally. The output cycle is a change cycle of the alternating current output by the three-level inverter.

Figure 10:
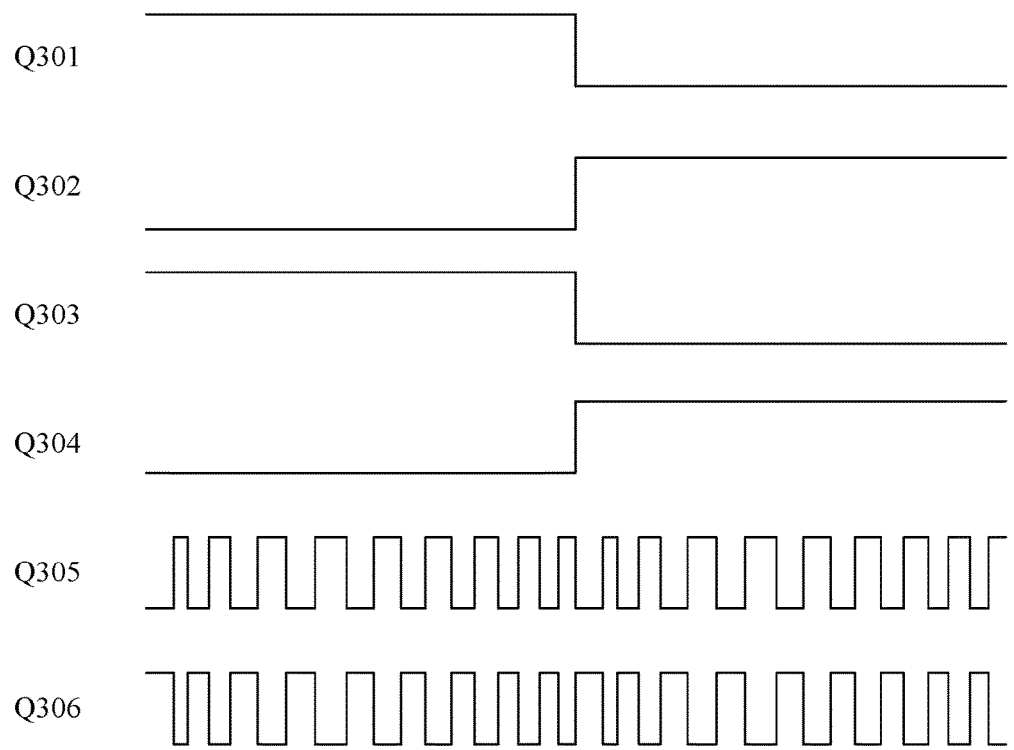
FIG. 10 is a schematic diagram of a control signal according to an example embodiment.
Figure 11:
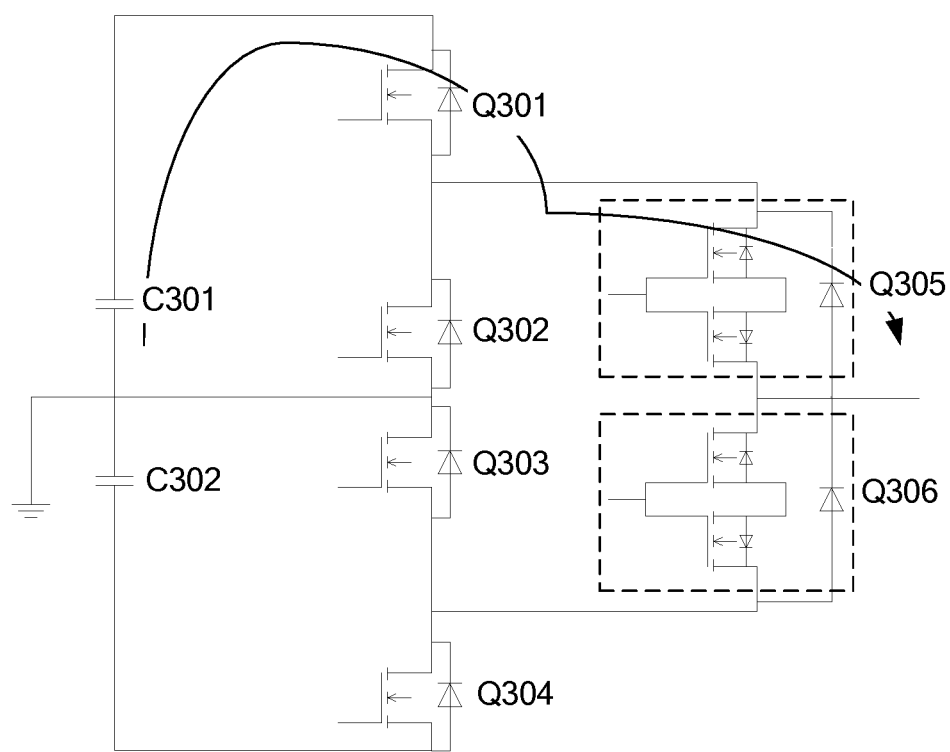
FIG. 11 is a schematic diagram of a flow direction of a current in a working state according to an example embodiment.
Figure 12:
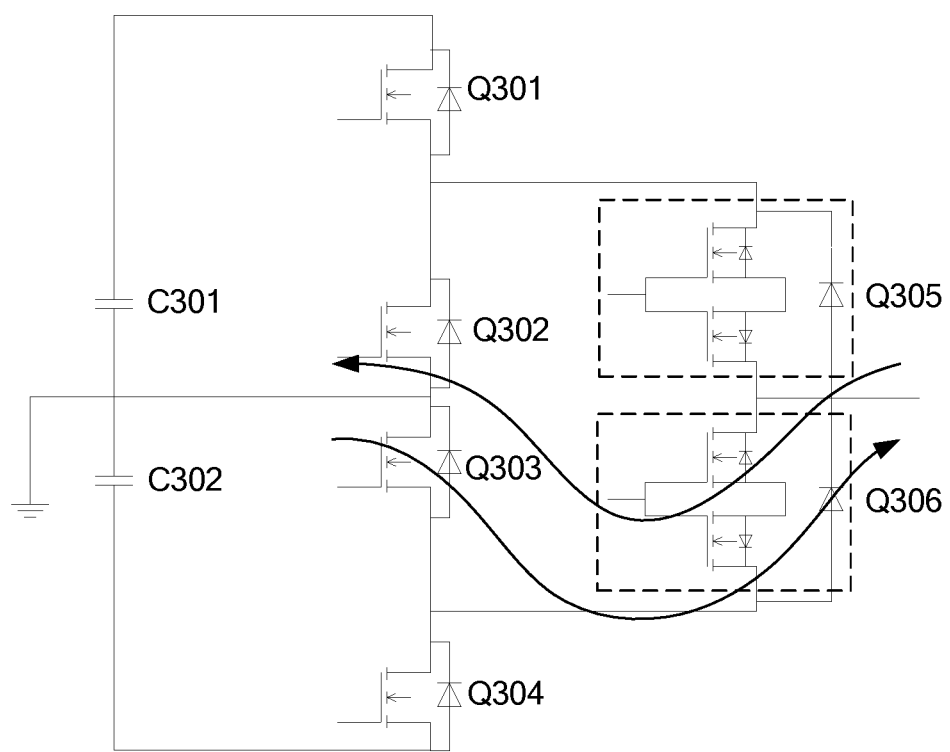
FIG. 12 is a schematic diagram of a flow direction of a current in a working state according to an example embodiment.
Figure 13:
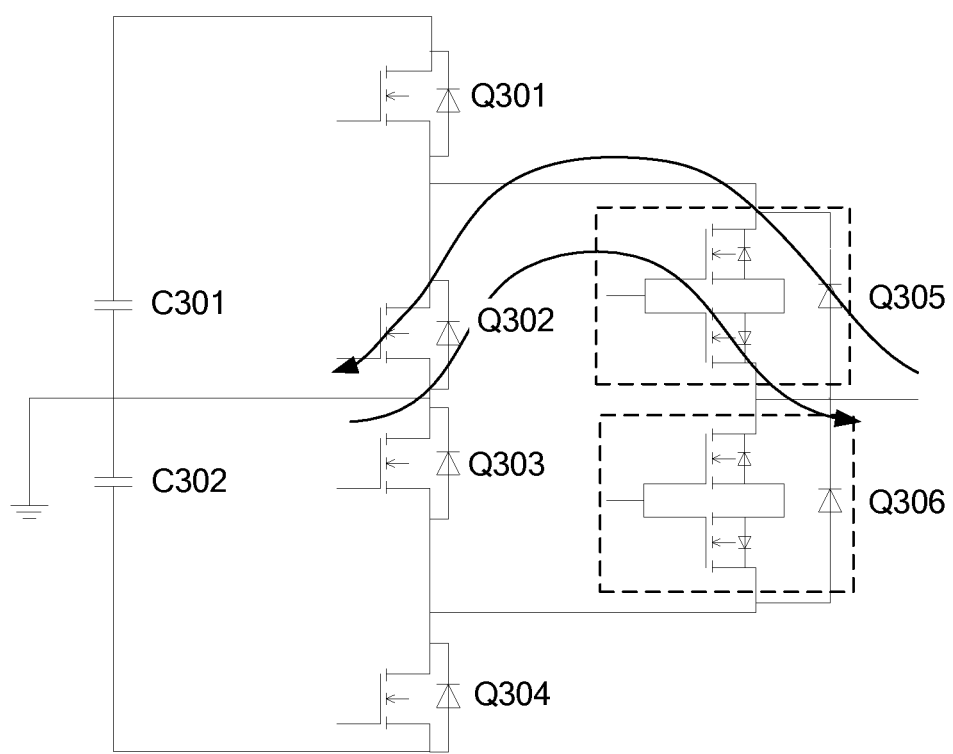
FIG. 13 is a schematic diagram of a flow direction of a current in a working state according to an example embodiment.
Figure 14:
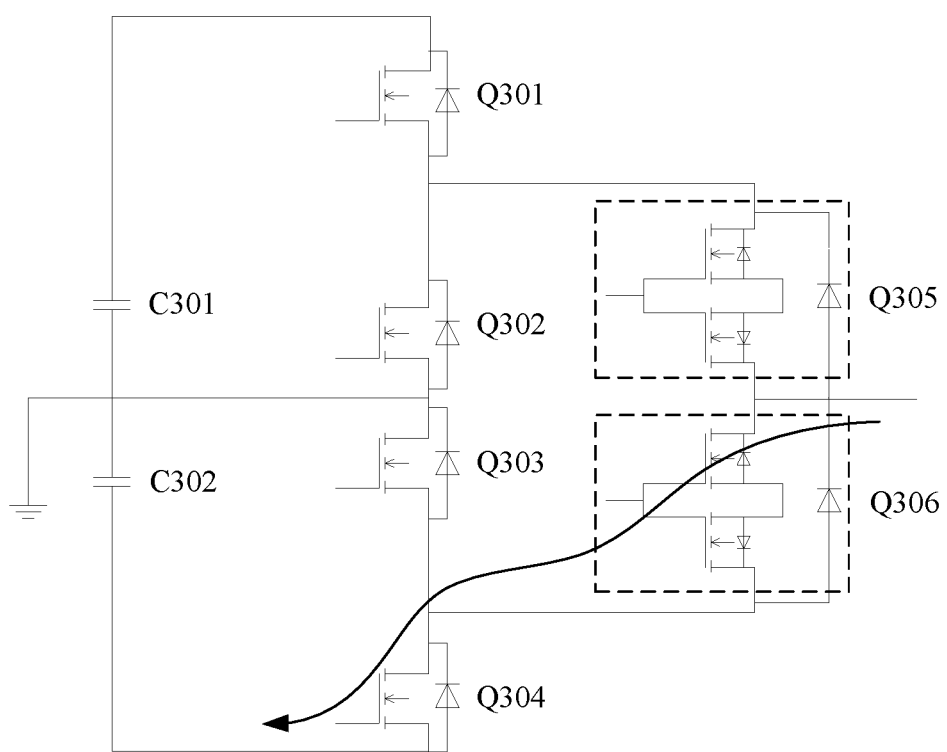
FIG. 14 is a schematic diagram of a flow direction of a current in a working state according to an example embodiment.

During implementation, when the three-level inverter is working, in the output positive half cycle, Q301 and Q303 are conducted, and Q302 and Q304 are cut off; in the output negative half cycle, Q302 and Q304 are conducted, and Q301 and Q303 are cut off; and in the output positive half cycle and the output negative half cycle, Q305 and Q306 are complementarily conducted, and there is a dead time. A specific control signal is shown in FIG. 10. FIG. 11 is a schematic diagram of a current when Q301 and Q305 are conducted in the positive half cycle, and a direction of the current is from C301 to Q301 and then to Q305. FIG. 12 is a schematic diagram of a current when Q303 and Q306 are conducted in the positive half cycle, and a direction of the current is from a ground terminal to Q303 and then to Q306, or is from Q306 to Q303 and then to a ground terminal. FIG. 13 is a schematic diagram of a current when Q302 and Q305 are conducted in the negative half cycle, and a direction of the current is from a ground terminal to Q302 and then to Q305, or is from Q305 to Q302 and then to a ground terminal. FIG. 14 is a schematic diagram of a current when Q304 and Q306 are conducted in the negative half cycle, and a direction of the current is from Q306 to Q304 and then to C302.

Optionally, the three-level inverter further includes at least one equivalent transistor group G. Each equivalent transistor group G includes two equivalent transistors that are connected in series. A branch circuit formed by connecting the two equivalent transistors in series is connected in parallel to branch circuits of the first equivalent transistor Q305 and the second equivalent transistor Q306. A connection end of the two equivalent transistors in each equivalent transistor group is an output end of the three-level inverter.

Figure 15:
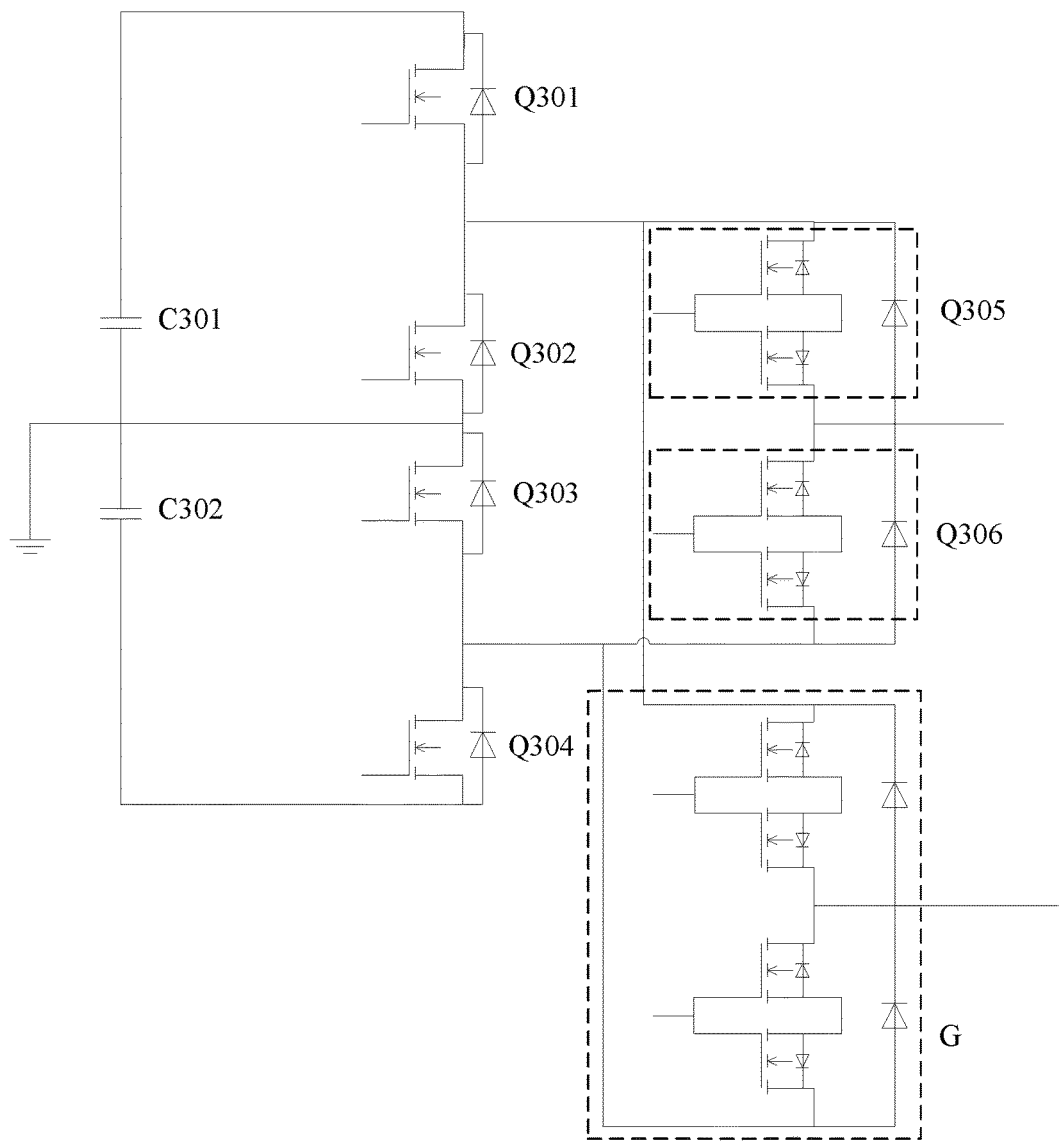
FIG. 15 is a schematic circuit diagram of a three-level inverter according to an example embodiment.

During implementation, a circuit structure of the three-level inverter may further include the at least one equivalent transistor group G As shown in FIG. 15, each equivalent transistor group G includes the two equivalent transistors that are connected in series. The branch circuit formed by connecting the two equivalent transistors in series is connected in parallel to the branch circuits of the first equivalent transistor Q305 and the second equivalent transistor Q306. The connection end of the two equivalent transistors in each equivalent transistor group is the output end of the three-level inverter. It is easily understood that Q305 and Q306 form an equivalent transistor group G, and in addition to different phases, control signals of all equivalent transistor groups may have the same other parameters. In addition, each output end may be connected to an LC filter. Filtered output voltages may form an alternating current with a higher frequency after being coupled in a staggered manner.

In the embodiments of this disclosure, an equivalent transistor includes a first transistor, a second transistor, and a diode. A source electrode of the first transistor is electrically connected to a source electrode of the second transistor; a gate electrode of the first transistor is electrically connected to a gate electrode of the second transistor; and one end of the diode is electrically connected to a drain electrode of the first transistor, and the other end of the diode is electrically connected to a drain electrode of the second transistor. In this way, the diode is a separate diode, and a diode with a relatively good reverse recovery feature may be used. Based on the structure of the equivalent transistor, a current cannot flow through parasitic diodes of the first transistor and the second transistor, but flows through the diode with the relatively good reverse recovery feature. Therefore, a reverse recovery time can be reduced, and a switching speed of the equivalent transistor can increase.

A person skilled in the art can easily figure out another implementation solution of this disclosure after considering the specification and practicing this disclosure. This application is intended to cover any variations, functions, or adaptive changes of this disclosure. These variations, functions, or adaptive changes comply with general principles of this disclosure, and include common knowledge or a commonly used technical means in the technical field that is not disclosed in this disclosure. The specification and the embodiments are merely considered as examples, and the actual scope and the spirit of this disclosure are pointed out by the following claims.

It should be understood that this disclosure is not limited to the accurate structures that are described in the foregoing and that are shown in the accompanying drawings, and modifications and changes may be made without departing from the scope of this disclosure. The scope of this disclosure is limited only by the appended claims.

What is claimed is:

1. An equivalent transistor, wherein the equivalent transistor comprises a first transistor, a second transistor, and a diode;
   a source electrode of the first transistor is electrically connected to a source electrode of the second transistor;
   a gate electrode of the first transistor is electrically connected to a gate electrode of the second transistor; and
   one end of the diode is electrically connected to a drain electrode of the first transistor, and the other end of the diode is electrically connected to a drain electrode of the second transistor.

2. The equivalent transistor according to claim 1, wherein the first transistor and the second transistor are MOSFETs.

3. The equivalent transistor according to claim 1, wherein the diode is a fast recovery diode.

4. The equivalent transistor according to claim 1, wherein a connection end of the gate electrode of the first transistor and the gate electrode of the second transistor is an equivalent gate electrode of the equivalent transistor; and
   a connection end of the source electrode of the first transistor and the source electrode of the second transistor is used to connect a low electric potential end.

5. A three-level inverter, wherein the three-level inverter is an I-type three-level inverter, and an outer switching transistor outer switching transistor of the three-level inverter is the equivalent transistor according to claim 1.

6. A three-level inverter, wherein the three-level inverter is an I-type three-level inverter, and an outer switching transistor outer switching transistor of the three-level inverter is the equivalent transistor according to claim 2.

7. A three-level inverter, wherein the three-level inverter is an I-type three-level inverter, and an outer switching transistor outer switching transistor of the three-level inverter is the equivalent transistor according to claim 3.

8. A three-level inverter, wherein the three-level inverter is an I-type three-level inverter, and an outer switching transistor outer switching transistor of the three-level inverter is the equivalent transistor according to claim 4.

9. The three-level inverter according to claim 5, wherein an inner switching transistor of the three-level inverter is a MOSFET.

10. The three-level inverter according to claim 9, wherein the three-level inverter comprises a first outer switching transistor, a second outer switching transistor, a first inner switching transistor, and a second inner switching transistor, and the first outer switching transistor, the first inner switching transistor, the second inner switching transistor, and the second outer switching transistor are sequentially connected in series to a circuit; and
    the first outer switching transistor and the second inner switching transistor are complementarily conducted, and the first inner switching transistor and the second outer switching transistor are complementarily conducted.

11. A three-level inverter, wherein the three-level inverter comprises two direct current power supplies, four power frequency rectifier transistors, and two equivalent transistors according to claim 1, the two direct current power supplies are a first direct current power supply and a second direct current power supply respectively, the four power frequency rectifier transistors are a first power frequency rectifier transistor, a second power frequency rectifier transistor, a third power frequency rectifier transistor, and a fourth power frequency rectifier transistor respectively, and the two equivalent transistors are a first equivalent transistor and a second equivalent transistor respectively;

a first end of the first power frequency rectifier transistor is electrically connected to a first end of the first direct current power supply, a second end of the first power frequency rectifier transistor is electrically connected to a first end of the second power frequency rectifier transistor, a second end of the second power frequency rectifier transistor is electrically connected to a second end of the first direct current power supply, a first end of the third power frequency rectifier transistor is electrically connected to a first end of the second direct current power supply, a second end of the third power frequency rectifier transistor is electrically connected to a first end of the fourth power frequency rectifier transistor, and a second end of the fourth power frequency rectifier transistor is electrically connected to a second end of the second direct current power supply;

the second end of the second power frequency rectifier transistor, the second end of the first direct current power supply, the first end of the third power frequency rectifier transistor, and the first end of the second direct current power supply are electrically connected and grounded;

a second end of the first equivalent transistor is electrically connected to a first end of the second equivalent transistor, a first end of the first equivalent transistor, the second end of the first power frequency rectifier transistor, and the first end of the second power frequency rectifier transistor are electrically connected, and a second end of the second equivalent transistor, the second end of the third power frequency rectifier transistor, and the first end of the fourth power frequency rectifier transistor are electrically connected; and a connection end of the first equivalent transistor and the second equivalent transistor is an output end of the three-level inverter.

12. The three-level inverter according to claim 11, wherein all of the four power frequency rectifier transistors are IGBTs.

13. The three-level inverter according to claim 11, wherein based on control signals of the first power frequency rectifier transistor, the second power frequency rectifier transistor, the third power frequency rectifier transistor, and the fourth power frequency rectifier transistor, in an output positive half cycle of the three-level inverter, the first power frequency rectifier transistor and the third power frequency rectifier transistor are conducted, and the second power frequency rectifier transistor and the fourth power frequency rectifier transistor are cut off; and in an output negative half cycle of the three-level inverter, the first power frequency rectifier transistor and the third power frequency rectifier transistor are cut off, and the second power frequency rectifier transistor and the fourth power frequency rectifier transistor are conducted; and based on control signals of the first equivalent transistor and the second equivalent transistor, the first equivalent transistor and the second equivalent transistor are complementarily conducted, and a switching cycle of complementary conduction is less than an output cycle of the three-level inverter.

14. The three-level inverter according to claim 11, wherein the three-level inverter further comprises at least one equivalent transistor group, each equivalent transistor group comprises two equivalent transistors that are connected in series, a branch circuit formed by connecting the two equivalent transistors in series is connected in parallel to branch circuits of the first equivalent transistor and the second equivalent transistor, and a connection end of the two equivalent transistors in each equivalent transistor group is an output end of the three-level inverter.

15. The equivalent transistor according to claim 1, wherein four pins are extended from the equivalent transistor, and wherein the four pins are respectively connected to two drain electrode ends of the two transistors, a common source electrode end, and a common gate electrode end.

* * * * *